United States Patent [19]

Cummins

[11] Patent Number: 4,520,692
[45] Date of Patent: Jun. 4, 1985

[54] SPEED DIFFERENTIAL DEVICE

[76] Inventor: George E. Cummins, 3005 W. 45th Pl., Tulsa, Okla. 74107

[21] Appl. No.: 422,605

[22] Filed: Sep. 24, 1982

[51] Int. Cl.³ .................. F16H 1/30; F16H 1/14; F16H 35/00; F16H 57/10
[52] U.S. Cl. .................. 74/799; 74/417; 74/385; 74/757; 74/665 GB
[58] Field of Search .............. 74/417, 416, 410, 713, 74/799, 385, 665 P, 665 M, 665 GB, 757, 798, 206, 777

[56] References Cited

U.S. PATENT DOCUMENTS

| | | | |
|---|---|---|---|
| 269,264 | 12/1882 | Cloyd | 74/417 X |
| 367,293 | 7/1887 | Hanser | 74/417 |
| 456,387 | 7/1891 | Stillman | 74/417 |
| 873,681 | 12/1907 | Pendleton | 74/757 |
| 1,281,448 | 10/1918 | Wendler | 74/385 |
| 2,355,144 | 8/1944 | Carlson | 74/799 |
| 2,486,671 | 11/1949 | Normann | 74/417 |
| 2,821,063 | 1/1958 | Sundt | 74/757 |
| 3,107,092 | 10/1963 | Morris et al. | 74/417 X |
| 3,375,727 | 4/1968 | Nasvytis et al. | 74/417 |
| 3,463,029 | 8/1969 | Chow | 74/417 X |
| 3,640,154 | 2/1972 | Massie | 74/757 X |
| 3,665,774 | 5/1972 | Bauhus et al. | 74/421 A X |
| 3,871,248 | 3/1975 | Barish | 74/417 |
| 4,286,481 | 9/1981 | Miller | 74/799 |
| 4,289,047 | 9/1981 | Hopkins | 74/713 |
| 4,296,654 | 10/1981 | Mercer | 74/385 |

FOREIGN PATENT DOCUMENTS 1223072 6/1960 France .................. 74/799

Primary Examiner—Allan D. Herrmann
Assistant Examiner—Stephen B. Andrews
Attorney, Agent, or Firm—Head, Johnson & Stevenson

[57] ABSTRACT

A speed differential device for achieving selected rotational speed differentials between a drive element and a driven element and comprising a main shaft having a pair of spaced rotational members journalled thereon in spaced relationship, an auxiliary shaft extending transversely with respect to the main shaft and having a pair of rotational elements secured to the outer ends thereof on the opposite sides of the main shaft, the auxiliary shaft being integrated with the main shaft whereby the axis of rotation of the auxiliary shaft is the longitudinal axis of the main shaft, one of the rotational members of the main shaft being in driving engagement with one of the rotational members of the auxiliary shaft for transmitting rotation therebetween, and the other rotational member of the auxiliary shaft being in driving engagement with the other of the rotational elements of the main shaft for transmitting rotation therebetween, the driving size ratio between the engaged rotational elements being selected whereby a selected rotational speed differential is achieved between the drive element and the driven element.

7 Claims, 1 Drawing Figure

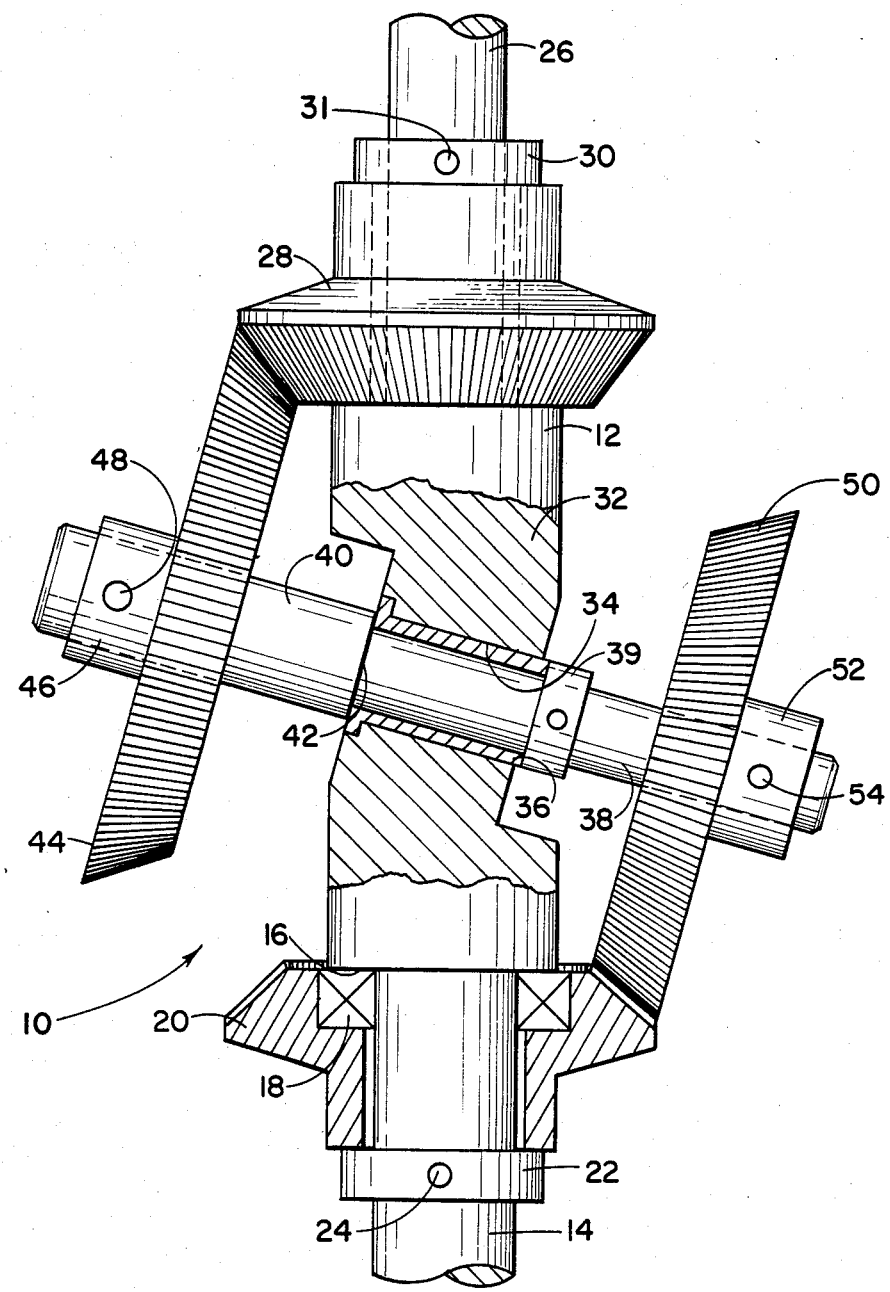

4,520,692

SPEED DIFFERENTIAL DEVICE

BACKGROUND OF THE INVENTION

1. Field of the Invention

This invention relates to improvements in speed differential devices and more particularly, but not by way of limitation, to a speed differential device wherein exceedingly great ratios of speed differential between input and output speeds may be achieved.

2. Description of the Prior Art

There are many instances wherein it is desirable to utilize the power output of a motor, or the like, having a great or high speed of rotation, but the high rate of speed of rotation is a disadvantage for the work operation to be performed. For example, in the operation of a shaping machine, lathe, or the like, it may be desirable to turn the work piece at a relatively slow rate of speed for facilitating the work operation thereon, but the power output of a high speed power source is required for the operation. As a result, many gear trains, speed reducers, speed differential devices, or the like, have been developed for being interposed between the high speed power source and the work piece. Examples of such devices are shown in the Hanser U.S. Pat. No. 367,293, issued July 26, 1887 and entitled "Driving Gear for Bicycles;" Stillman, Jr. U.S. Pat. No. 456,387, issued July 21, 1891, and entitled "Bicycle;" Kaestner U.S. Pat. No. 479,189, issued July 19, 1892, and entitled "Brewer's Mashing Machine;" Nasvytis et al U.S. Pat. No. 3,375,727, issued April 2, 1968, and entitled "Transversely Oriented Reduction Drive;" and the Barish U.S. Pat. No. 3,871,248, issued Mar. 18, 1975, and entitled "Two-Power-Path Bevel Gearing For High Loads and High Speeds." All of these references disclosed speed alteration devices for either increasing or decreasing the speed of an initial source, but none is particularly designed for achieving a rotational speed differential of approximately 1:10,000 in an econmical feasible or practical manner.

Other patents relating to speed differential devices are: Cloyd U.S. Pat. No. 269,264, issued Dec. 19, 1882, and entitled "Boring Machine;" Morris et al U.S. Pat. No. 3,107,092, issued Oct. 15, 1963 and entitled "Motor Driven Jumping Ropes Rotatable in Opposite Directions;" Chow U.S. Pat. No. 3,463,029, issued Aug. 26, 1969 and entitled "Omnidirectional Power Transmission Device;" Bauhaus et al U.S. Pat. No. 3,665,774, issued May 30, 1972, and entitled "Driving Assembly;" Millder U.S. Pat. No. 4,286,481, issued Sept. 1, 1981, and entitled "Power Transfer Device;" Hopkins U.S. Pat. No. 4,289,047, issued Sept. 15, 1981, and entitled "Differential Gear Positioning Means;" and Mercer U.S. Pat. No. 4,296,654, issued Oct. 27, 1981, and entitled "Adjustable Angled Socket Wrench Extension." These references relate generally to speed differential devices, but here again, there is no teaching of a device wherein the speed differential ratio of approximately 1:10,000 may be attained in any practical manner.

SUMMARY OF THE INVENTION

The present invention contemplates a novel device designed for achieving a great rotational speed differential in a simple and economically feasible manner. The novel device comprises a main rotatable shaft having a pair of substantially identical but oppositely disposed bevel gears journalled thereon in spaced relation. A secondary shaft extends transversely through or with respect to the main shaft, preferably substantially centrally disposed between the two bevel gears, but not limited thereto, and suitable mating bevel gears are secured to the opposite ends of the secondary shaft. One of the secondary shaft gears is disposed in a meshing engagement with the first of the bevel gears, and the second of the secondary shaft gears is disposed in a meshing engagement with the second of the bevel gears. Upon the selection of a proper gear tooth ratio between all of the gears, an exceedingly great speed differential, or substantially any desired speed differential may be attained between a drive means and a driven means.

For example, assuming the first bevel gear is provided with 101 teeth, and is in meshing engagement with the first secondary shaft gear having 100 teeth, and the second secondary shaft gear is provided with 99 teeth and is in meshing engagement with the second bevel gear having 100 teeth, the speed of rotation between the drive means and driven means can be 1:10,000, or 10,000:1.

If we assume that the first bevel gear is provided with 201 teeth and is in meshing engagement with the first secondary shaft gear having 200 teeth, and the second secondary shaft gear is provided with 199 teeth and is in meshing engagement with the second bevel gear having 200 teeth, the speed of rotation between the drive means and driven means can be 1:40,000, or 40,000:1.

It will be readily apparent that the novel combination of gears and teeth ratios carried by intersecting support shafts provides a simple and economical speed differential device for achieving tremendously large rotational speed differentials or substantially any desired rotational speed differentials between a drive shaft means and a driven gear means, or other drive and driven means. The novel device is simple and efficient in operation and economical and durable in construction.

BRIEF DESCRIPTION OF THE DRAWINGS

The FIGURE is a side elevational view of a speed differential device embodying the invention, with portions thereof depicted in section for purposes of illustration.

DETAILED DESCRIPTION OF THE PREFERRED EMBODIMENT

Referring to the drawings in detail, reference character 10 generally indicates a speed differential device comprising a main shaft 12 having a reduced neck portion 14 extending axially outwardly at one end thereof to provide an annular shoulder 16. A suitable bearing means 18 is disposed around the outer periphery of the reduced neck 14 and adjacent the shoulder 16 for rotatably supporting a bevel gear 20, or the like, for free rotation with respect to the shaft 12 and about the longitudinal axis of the neck 14 thereof. A retainer ring 22 is disposed around the outer periphery of the neck 14 outboard of the gear 20 for retaining the gear 20 in position on the reduced neck 14, and may be secured to the neck 14 in any suitable manner, such as by a set screw or locking pin 24, as is well known.

A reduced neck portion 26 is provided at the opposite end of the shaft 12 and extends longitudinally or axially outwardly therefrom similar to the neck 14. A second bevel gear 28, or the like, is disposed around the outer periphery of the neck 26 and is supported by suitable bearing means (not shown) similar to the bearing means 18 whereby the gear 28 is freely rotatable with respect to the shaft 12 and about the longitudinal axis of the neck 26. A retainer ring 30 similar to the retainer 22 is disposed around the outer periphery of the neck 26 and disposed outboard of the gear 28 for retaining the gear in position on the shaft 12. The retainer 30 may be secured to the neck 26 in any suitable manner, such as a set screw or locking pin 31, as is well known.

The portion 32 of the shaft 12 which is interposed between the gears 20 and 28 is canted or disposed at an angle with respect to the longitudinal axes of the neck portions 14 and 26, and is provided with a bore 34 extending transversely therethrough. A flanged bushing 36 is disposed in the bore 34 for receiving a secondary shaft 38 therethrough and may be secured within the bore 34 in any suitable or well known manner (not shown). The shaft 38 is preferably provided with an enlarged diameter portion 40 providing an outwardly extending annular shoulder 42 for bearing against the one end of the bushing sleeve 36. A mating bevel gear 44, or the like, is disposed around the enlarged diameter portion 40 and is preferably disposed thereon in such a manner that the hub member 46 is disposed outboard of the toothed portion thereof. The hub member 46 may be secured to the enlarged diameter portion 40 in any suitable manner, such as by a set screw or locking pin means 48, as desired, thus securing the gear 44 to the shaft 38 for simultaneous rotation therebetween about the longitudinal axis of the shaft 38. The gear 44 is in meshing engagement with the gear 28, as clearly shown in the drawing.

A second mating gear 50 is disposed around the shaft 38 on the opposite side of the shaft portion 32, and is preferably positioned thereon in such a manner that the hub member 52 thereof is disposed outboard of the toothed portion thereof. The hub 52 may be secured to the shaft 38 in any well known manner, such as a set screw or locking pin 54, as desired, whereby the shaft 38 and gear 50 rotate simultaneously about the longitudinal axis of the shaft 38. The gear 50 is in meshing engagement with the gear 20.

It is to be understood that the secondary shaft 38 does not have to pass through the center of the shaft 12, but may be offset with respect thereto, if desired. In addition, it is to be noted that a second auxiliary shaft (not shown) and corresponding end gears or mating bevel gears (not shown) may be provided in addition to the auxiliary shaft 38, if desired.

In addition, it may be desirable to provide an eccentric configuration for the outer periphery of one or more of the auxiliary shaft gears secured to the outer ends of the shaft 38, and the face of at least one of the bevel gears 20 or 28. With this arrangement between the mating or meshing pairs of bevel gears, an oscillatory action of the bevel gear may be achieved. The oscillation produced may be utilized to produce vibrations, if desired.

Of course, the shafts may be either of a solid construction, or may be hollow, or may be of sectional construction, and may be arranged in substantially any relatively skew relationship. Frictional engagement members may be utilized in lieu of the gears 20, 28, 44 and 50 if desired. In this instance the rotational speed differentials may be attained by selecting diametric size ratios rather than the selection of tooth ratios as in the case of gear application.

Furthermore, it may be desirable to provide a collar 39 adjustably secured to the shaft 38 and oppositely disposed with respect to the shoulder 42 for facilitating an adjustment of the longitudinal position of the shaft 38.

Several operational modes are available for the speed differential device 10. In one operational mode, the main shaft 12 may be held against rotation about the longitudinal axes of the necks 14 and 26, and the auxiliary shaft 38 may be rotated about its own longitudinal axis. In this instance, the auxiliary shaft gears 44 and 50 will rotate simultaneously with the rotation of the shaft 38, transmitting rotation simultaneously to the bevel gears 20 and 28. The relative number of teeth provided between the meshing gears will determine the speed of rotation of one bevel gear with respect to the other.

In another operational mode for the device 10, one of the bevel gears, such as the gear 20, may be held stationary, and the main shaft 12 may be rotated about the axes of the necks 14 and 26. The shaft 38 will be rotated by the main shaft in such a manner that the axis of rotation of the shaft 38 is the longitudinal axis of the main shaft 12, causing the auxiliary shaft gear 50 to "roll" along the surface of the stationary bevel gear 20. This causes the shaft 38 to rotate about its longitudinal axis while the shaft 38, as a whole, is also rotated. Thus, the gear 44 is rotated for transmitting rotation to the bevel gear 28.

Still another operational mode for the device 10 may be achieved by retaining the opposite bevel gear 28 against rotation, and rotating the main shaft 12 about the axes of the necks 14 and 26 for providing a rotation for the auxiliary shaft by the main shaft in such manner that the axis of rotation of the shaft 38 is the longitudinal axis of the main shaft. This causes the gear 44 to "roll" about the face of the gear 28, transmitting rotation to the shaft 38 for rotation of the gear 50. The rotation of the gear 50 transmits rotation to the gear 20.

A further operational mode for the device 10 may be achieved by maintaining the main shaft 12 against rotation about the axes of the necks 14 and 26, and rotating one of the bevel gears, such as the gear 28, with respect thereto. This transmits rotation to the auxiliar shaft gear 44 for rotation of the auxiliary shaft 38 about its own longitudinal axis, ans also transmits a simultaneous rotation to the gear 50. The rotation of the gear 50 transmits rotation to the gear 20.

In the third mode of operation described hereinbefore, the relative speed of rotation between input drive shaft 12 and the gear 20 may be determined from the following formula:

$$1 - \left( \frac{A}{B} \times \frac{C}{D} \right) = R$$

wherein:
A = the number of teeth in gear 28
B = the number of teeth in gear 44
C = the number of teeth in gear 50
D = the number of teeth in gear 20
R is the rotational travel of gear 20 when shaft 12 turns one revolution.

The second mode of operation transmits rotation to gear 28 and R equals rotational travel of gear 28 when shaft 12 turns one revolution. The following formula applies:

$$1 - \left(\frac{B}{A} \times \frac{D}{C}\right) = R$$

By way of example, assuming the gear 28 has 101 teeth, the gear 44 has 100 teeth, gear 50 has 99 teeth and gear 20 has 100 teeth, the ratio of speed of rotation will be 1:10,000. Similarly, assuming that the gear 28 has 201 teeth, gear 44 has 200 teeth, gear 50 has 199 teeth and gear 20 has 200 teeth, the ratio of speed rotation will be 1:40,000.

As hereinbefore set forth, frictionally engagable elements may be utilized in lieu of the gears 28, 44, 50 and 20, if desired, and in order to achieve the same speed rotational ratios, the relative diametric sizes of the frictionally engagable elements may be properly selected generally similar to the gear teeth relationships. The auxiliary shaft means may be of either a unitary or sectional construction and is, in fact, a means of coordinating and controlling the relative position and rotation of the gears at its ends.

From the foregoing, it will be apparent that the present invention provides a novel speed differential device wherein a great reduction in speed, a great increase in speed, or substantially any speed ratio between a drive means and a driven means may be achieved in an economical and practical manner. A main shaft is provided with a pair of spaced bevel gear members journalled thereon, and an auxiliary shaft is interposed between the spaced bevel gear members and extends transversely with respect to the main shaft, or is non-copanar with relation thereto, as desired, and the journals of the auxiliary shaft move as the main shaft moves. A pair of mating gear members are provided at the opposite ends of the auxiliary shaft means, with each of the auxiliary gears being in meshing engagement with a different bevel gear. The relative rotational speed possible between the drive central shaft and a rotating bevel gear may be achieved with great speed differentials therebetween, or with substantially any desired speed ratio therebetween.

Whereas the present invention has been described in particular relation to the drawings attached hereto, it should be understood that other and further modifications, apart from those shown or suggested herein may be made within the spirit and scope of this invention.

What is claimed is:

1. A speed differential device for a drive means and a driven means and comprising main shaft means, a pair of first angle rotatable elements secured in the proximity of the opposite ends of said main shaft means in spaced relation and independently rotatable with respect thereto, auxiliary shaft means interposed between the spaced first single rotatable elements and extending transversely with respect to the main shaft means, the auxiliary shaft means being rotated by the main shaft in such manner that the axis of rotation of the auxiliary shaft is the longitudinal axis of the main shaft, a pair of second single rotatable elements secured to said auxiliary shaft means and disposed on opposite sides of the main shaft means, one of said first single rotatable elements being disposed in driving engagement with one of said second single rotatable elements, and the second of said second single rotatable elements being in driving engagement with the second of said first single rotatable elements, the single rotatable elements being sized with relation to one another to provide a selected speed differential ratio between the drive means and the driven means, and wherein the first rotatable elements are level gears, and the second rotatable elements are mating bevel gears, and the ratio of teeth of the gears are selected to provide the selected speed differential between the drive means and the driven means, and wherein the first of the bevel gears is in engagement with the first of the mating bevel gears and the second of the bevel gears is in meshing engagement with the second of the mating bevel gears, the number of teeth in the first mating bevel gear being one less than the number of teeth in the first bevel gear, the number of teeth in the second mating bevel gear being one less than the number of teeth in the first mating bevel gear, and the number of teeth in the second bevel gear being equal to the number of teeth in the first mating bevel gear.

2. A speed differential device for a drive means and a driven means and comprising main shaft means, a pair of first single rotatable elements secured in the proximity of the opposite ends of said main shaft means in spaced relation and independently rotatable with respect thereto, auxiliary shaft means interposed between the spaced first single rotatable elements and extending transversely with respect to the main shaft means, the auxiliary shaft means being rotated by the main shaft in such manner that the axis of rotation of the auxiliary shaft is the longitudinal axis of the main shaft, a pair of second single rotatable elements secured to said auxiliary shaft means and disposed on opposite sides of the main shaft means, one of said first single rotatable elements being disposed in driving engagement with one of said second single rotatable elements, and the second of said second single rotatable elements being in driving engagement with the second of said first single rotatable elements, the single rotatable elements being sized with relation to one another to provide a selected speed differential ratio between the drive means and the driven means, and wherein the first rotatable elements are bevel gears, and the second rotatable elements are mating bevel gears, and the ratio of teeth of the gears are selected to provide the selected speed differential between the drive means and the driven means, and wherein the first of the bevel gears is in engagement with the first of the mating bevel gears and the second of the bevel gears is in meshing engagement with the second of the mating bevel gears, the number of teeth in the first mating bevel gear being one more than the number of teeth in the first bevel gear, the number of teeth in the second mating bevel gear being one more than the number of teeth in the second bevel gear, and the number of teeth in the first bevel gear being equal to the number of teeth in the second mating bevel gear.

3. A speed differential device as set forth in claim 1 or 2 wherein the longitudinal axis of the auxiliary shaft means is angularly disposed with respect to the perpendicular of the longitudinal axis of rotation of the main shaft means.

4. A speed differential device as set forth in claim 1 or 2 wherein the main shaft means is provided with bore means extending transversely therethrough, and the auxiliary shaft means extends through said bore means.

5. A speed differential device as set forth in claim 4 and including bearing means disposed in said bore means for journalling the auxiliary shaft means for rotation about its own longitudinal axis independently of the main shaft means.

6. A speed differential device as set forth in claim 4 wherein bearing means is disposed in said bore means for rotatably supporting the auxiliary shaft means for rotation about its own longitudinal axis independently of the main shaft means in one operational mode of the speed differential device and simultaneously with said rotation thereof by the main shaft means.

7. A speed differential device as set forth in claim 1 or 2 wherein the main shaft means comprises axially aligned shank means at the opposite ends thereof for rotatably supporting the pair of first single rotatable elements in said spaced relation, and an angularly extending shank portion interposed between the axially aligned shank means, said angularly extending shank portion being provided with bore means extending transversely therethrough for receiving the auxiliary shaft means therein.

* * * * *